US010232932B2

(12) United States Patent
Baldwin et al.

(10) Patent No.: US 10,232,932 B2
(45) Date of Patent: Mar. 19, 2019

(54) HIGH STIFFNESS HUB ASSEMBLY FOR PROPROTOR SYSTEMS

(71) Applicant: Bell Helicopter Textron Inc., Fort Worth, TX (US)

(72) Inventors: Tyler Wayne Baldwin, Fort Worth, TX (US); Jouyoung Jason Choi, Fort Worth, TX (US); Richard Erler Rauber, Fort Worth, TX (US); Frank Bradley Stamps, Fort Worth, TX (US)

(73) Assignee: Bell Helicopter Textron Inc., Fort Worth, TX (US)

( * ) Notice: Subject to any disclaimer, the term of this patent is extended or adjusted under 35 U.S.C. 154(b) by 251 days.

(21) Appl. No.: 15/466,825

(22) Filed: Mar. 22, 2017

(65) Prior Publication Data

US 2018/0273160 A1 Sep. 27, 2018

(51) Int. Cl.

| B63H 1/06 | (2006.01) |
|---|---|
| B64C 11/34 | (2006.01) |
| B64C 29/00 | (2006.01) |
| B64C 11/00 | (2006.01) |
| B64C 27/605 | (2006.01) |
| F16D 3/62 | (2006.01) |

(52) U.S. Cl.
CPC ............ B64C 11/34 (2013.01); B64C 11/008 (2013.01); B64C 27/605 (2013.01); B64C 29/0033 (2013.01)

(58) Field of Classification Search
CPC ...... B64C 11/343; B64C 11/346; F16C 11/06; F16C 23/10

USPC .... 416/134 A, 140; 384/107, 192, 247, 248, 384/251
See application file for complete search history.

(56) References Cited

U.S. PATENT DOCUMENTS

| 4,121,437 | A | * | 10/1978 | Michel | ...................... F16D 3/28 |
|---|---|---|---|---|---|
| | | | | | 464/125 |
| 4,729,753 | A | * | 3/1988 | Neathery | ................ B64C 27/35 |
| | | | | | 416/102 |
| 5,186,686 | A | | 2/1993 | Staples et al. | |
| 5,601,408 | A | | 2/1997 | Hunter et al. | |
| 5,620,305 | A | | 4/1997 | McArdle | |
| 6,007,298 | A | | 12/1999 | Karem | |
| 6,296,444 | B1 | * | 10/2001 | Schellhase | .............. B64C 27/32 |
| | | | | | 416/134 A |
| 6,641,365 | B2 | | 11/2003 | Karem | |
| 7,632,188 | B2 | * | 12/2009 | Gleasman | ................. F16D 3/16 |
| | | | | | 464/73 |

(Continued)

*Primary Examiner* — John Kwon

(74) *Attorney, Agent, or Firm* — Lawrence Youst PLLC

(57) ABSTRACT

A high stiffness hub assembly for a proprotor system operable to rotate with a mast of a tiltrotor aircraft having helicopter and airplane flight modes. The hub assembly includes a yoke and a constant velocity joint assembly. The yoke has four blade arms each adapted to hold a proprotor blade. The constant velocity joint assembly provides a torque path from the mast to the yoke that includes a trunnion assembly, four drive links and four pillow blocks. The trunnion assembly is coupled to the mast and has four outwardly extending trunnions. Each drive link has a leading bearing coupled to one of the trunnions and a trailing bearing coupled to one of the pillow blocks. Each pillow block is independently mounted between an upper surface of the yoke and a hub plate with two connection members that extend through the yoke and the pillow block.

20 Claims, 9 Drawing Sheets

(56) References Cited

U.S. PATENT DOCUMENTS

| | | | |
|---|---|---|---|
| 8,038,539 B2* | 10/2011 | Stamps | B64C 29/0033 |
| | | | 464/138 |
| 8,226,355 B2 | 7/2012 | Stamps et al. | |
| 9,126,680 B2 | 9/2015 | Stamps et al. | |
| 9,254,915 B2 | 2/2016 | Stamps | |
| 2013/0105637 A1 | 5/2013 | Stamps et al. | |
| 2014/0248150 A1 | 9/2014 | Sutton et al. | |
| 2014/0271180 A1* | 9/2014 | Haldeman | F01D 7/00 |
| | | | 416/1 |
| 2015/0307187 A1* | 10/2015 | Burnett | F16F 1/41 |
| | | | 244/17.11 |

* cited by examiner

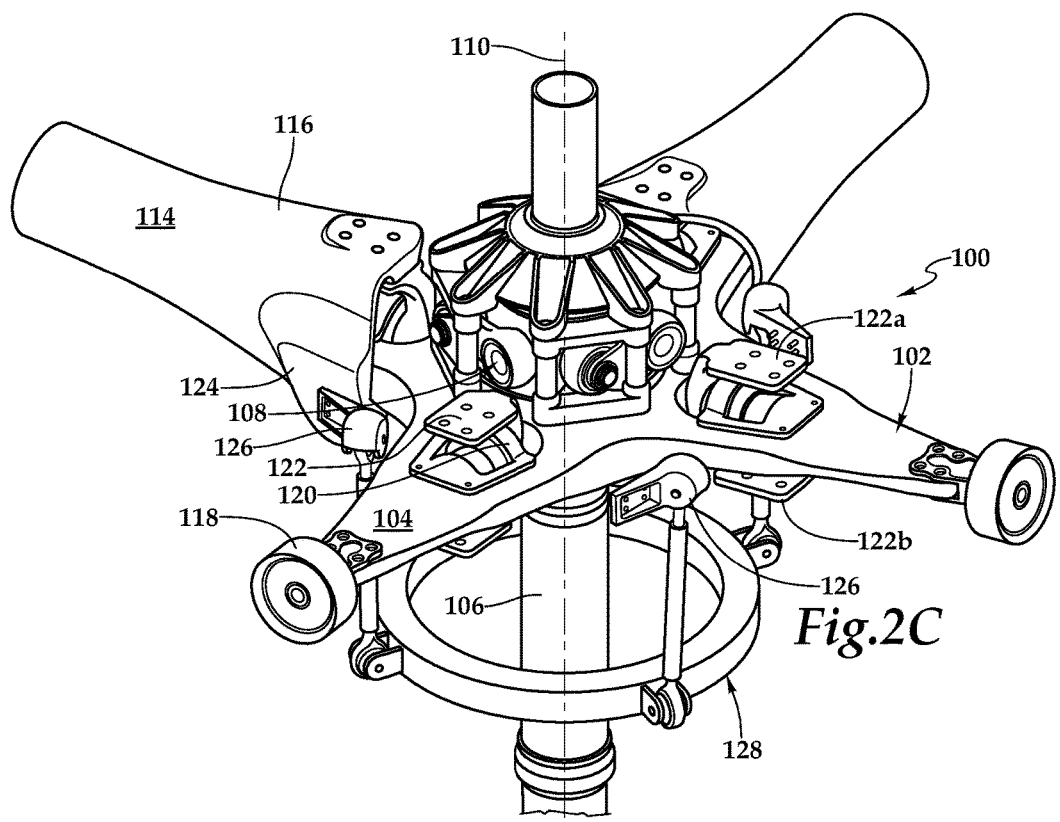
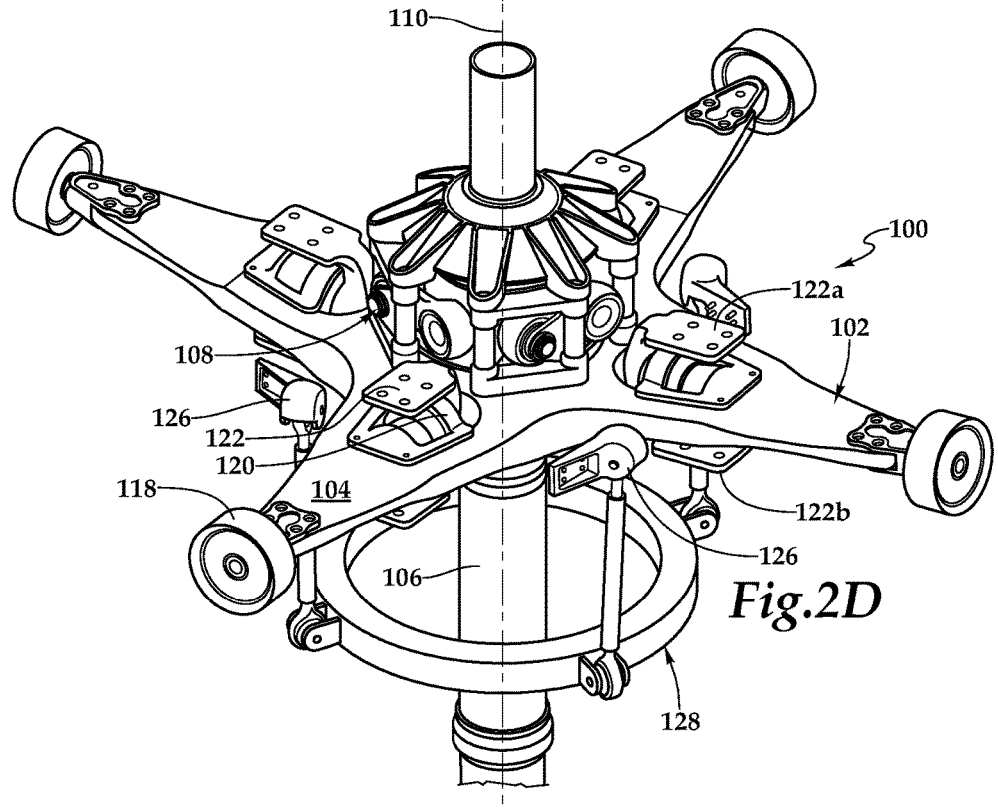

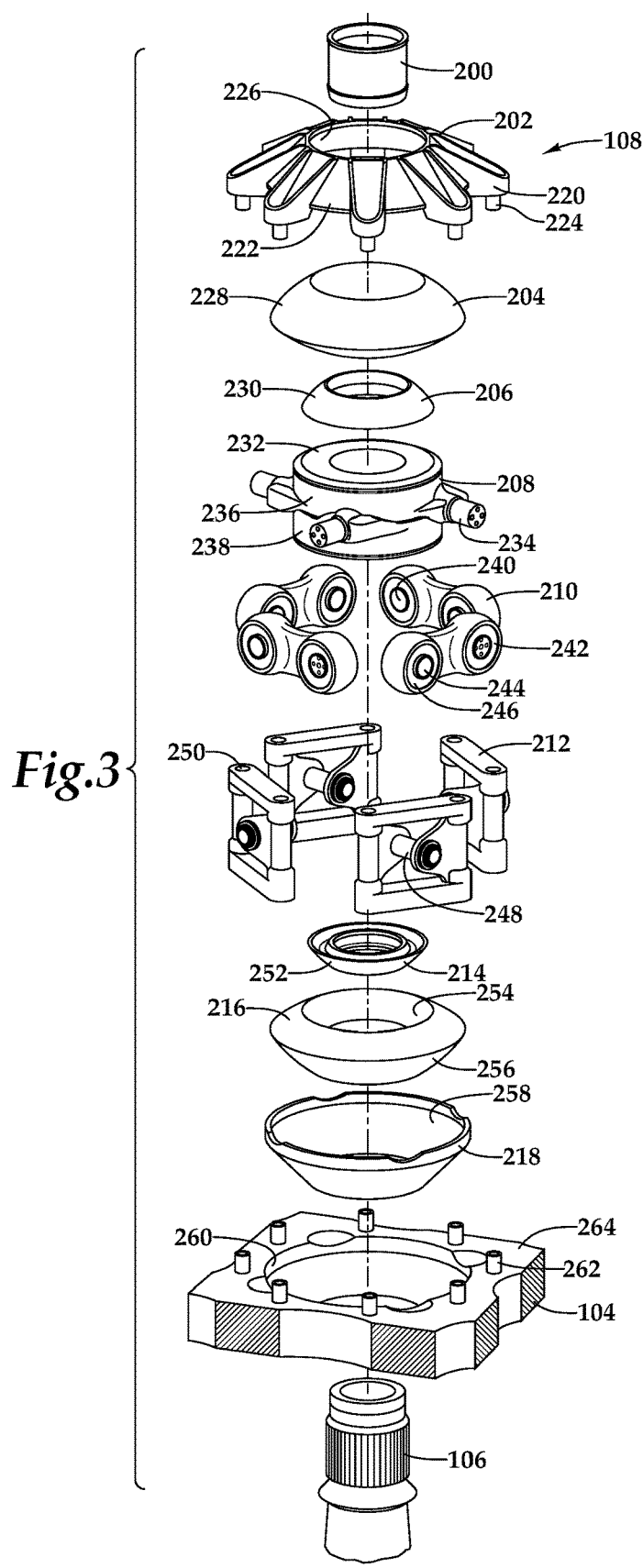

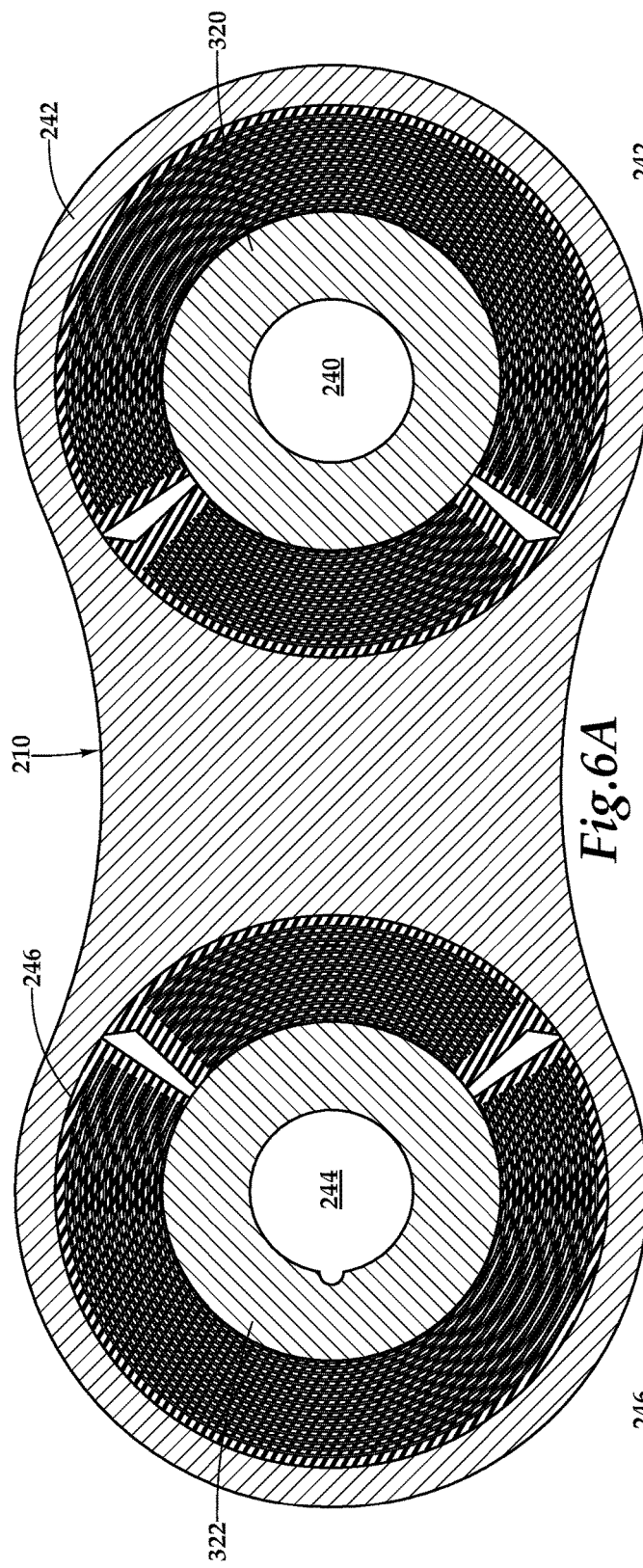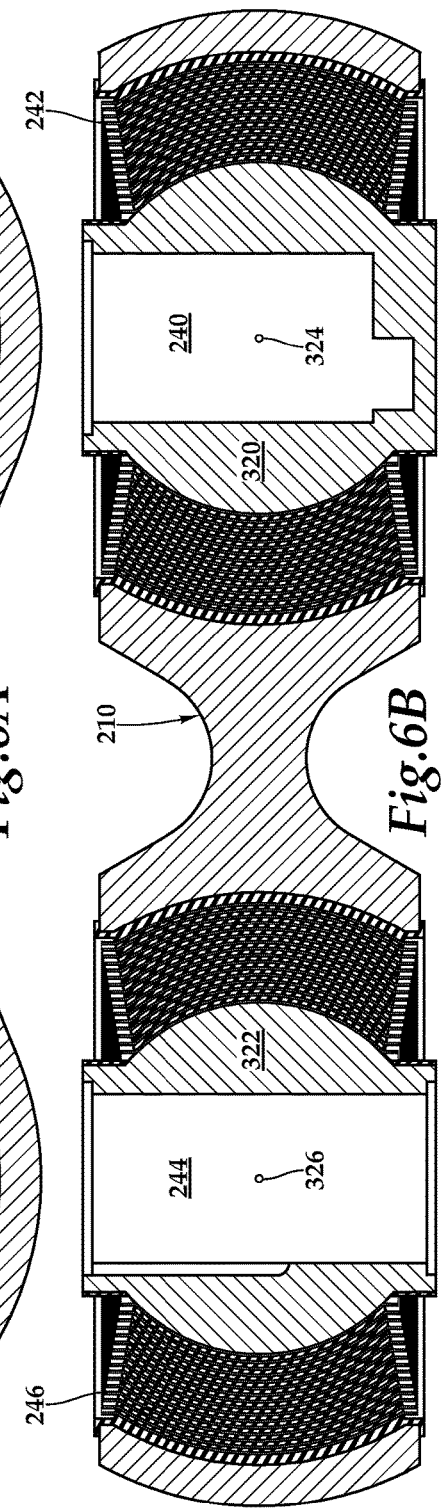

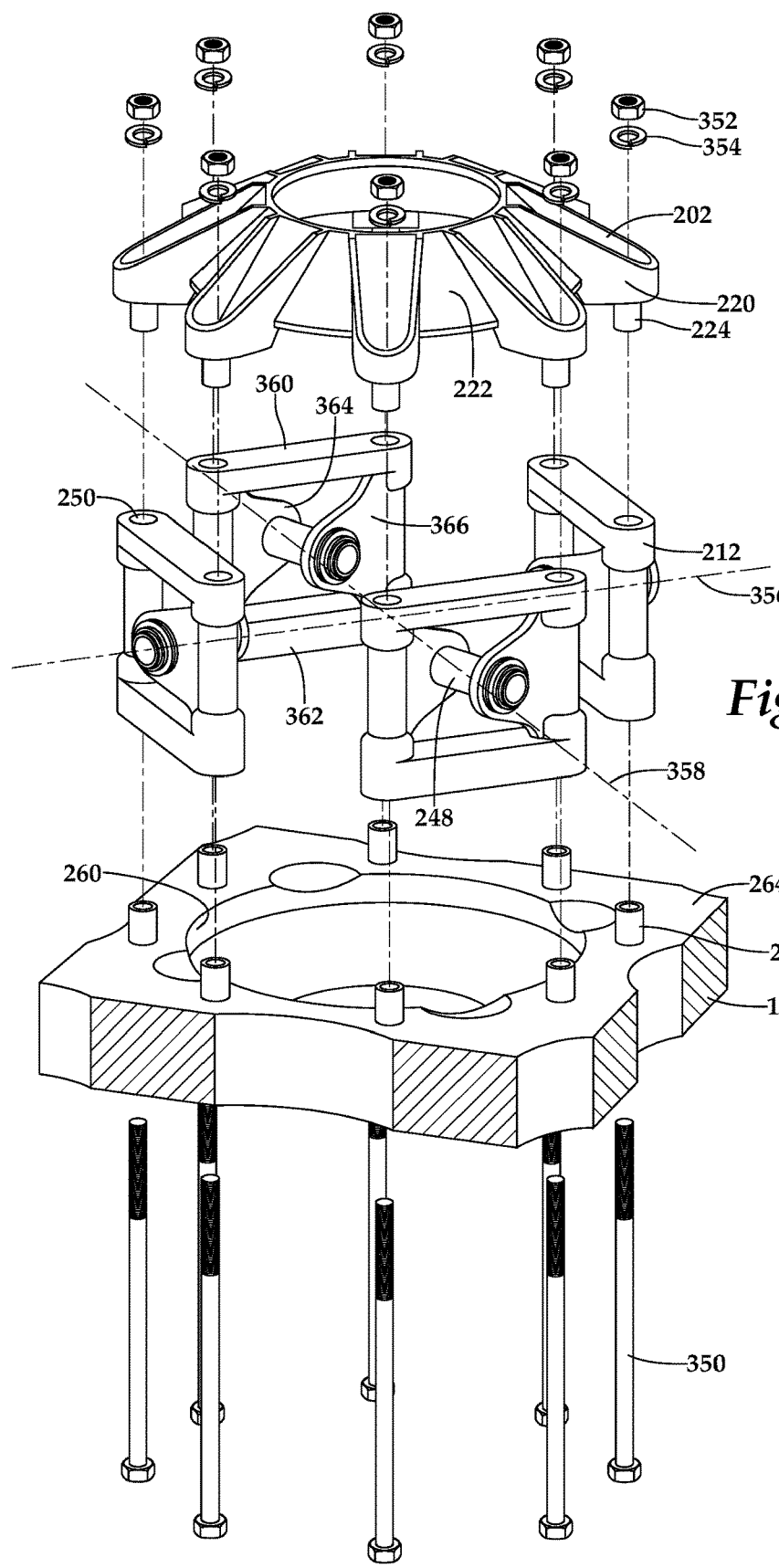

HIGH STIFFNESS HUB ASSEMBLY FOR PROPROTOR SYSTEMS

TECHNICAL FIELD OF THE DISCLOSURE

The present disclosure relates, in general, to proprotor systems operable for use on tiltrotor aircraft having helicopter and airplane flight modes and, in particular, to a high stiffness hub assembly for proprotor systems producing a first-in-plane frequency greater than 2.0/rev in airplane flight mode.

BACKGROUND

Tiltrotor aircraft typically include multiple propulsion assemblies that are positioned near outboard ends of a fixed wing. Each propulsion assembly may include an engine and transmission that provide torque and rotational energy to a drive shaft that rotates a proprotor system including a hub assembly and a plurality of proprotor blades. Typically, at least a portion of each propulsion assembly is rotatable relative to the fixed wing such that the proprotor blades have a generally horizontal plane of rotation providing vertical thrust for takeoff, hovering and landing, much like a conventional helicopter, and a generally vertical plane of rotation providing forward thrust for cruising in forward flight with the fixed wing providing lift, much like a conventional propeller driven airplane. In addition, tiltrotor aircraft can be operated in configurations between the helicopter flight mode and the airplane flight mode, which may be referred to as conversion flight mode.

Physical structures have natural frequencies of vibration that can be excited by forces applied thereto as a result of operating parameters and/or environmental conditions. These frequencies are determined, at least in part, by the materials and geometrical dimensions of the structures. In the case of tiltrotor aircraft, certain structures having critical natural frequencies include the fuselage, the fixed wing and various elements of the propulsion assemblies. One important operating parameter of a tiltrotor aircraft is the angular velocity or revolutions per minute (RPM) of the proprotor blades, which may generate excitation frequencies corresponding to 1/rev (1 per revolution), 2/rev, 3/rev, etc. An important environmental condition experienced by tiltrotor aircraft is forward airspeed, which may induce proprotor aeroelastic instability, similar to propeller whirl flutter, which may couple to the fixed wing of tiltrotor aircraft. It has been found that forward airspeed induced proprotor aeroelastic instability is a limiting factor relating to the maximum airspeed of tiltrotor aircraft in the airplane flight mode.

SUMMARY

In a first aspect, the present disclosure is directed to a high stiffness hub assembly for a proprotor system operable to rotate with a mast of a tiltrotor aircraft having a helicopter flight mode and an airplane flight mode. The hub assembly includes a yoke and a constant velocity joint assembly. The yoke has four blade arms each adapted to hold a proprotor blade. The yoke has a rotational plane and an upper surface. The constant velocity joint assembly provides a torque path from the mast to the yoke. The torque path includes a trunnion assembly; four drive links and four pillow blocks. The trunnion assembly is coupled to the mast and has four outwardly extending trunnions. Each of the drive links has a leading bearing coupled to one of the trunnions and a trailing bearing coupled to one of the pillow blocks. Each pillow block is independently mounted between the upper surface of the yoke and a hub plate with two connection members extending through the yoke and the pillow block. The constant velocity joint assembly provides a gimballing degree of freedom for the yoke relative to the mast.

In some embodiments, the hub assembly may include upper and lower hub springs wherein the upper hub spring is disposed between the trunnion assembly and the hub plate and the lower hub spring is disposed between the trunnion assembly and the yoke such that the upper and lower hub springs are operable to dampen movement of the yoke in the gimballing degree of freedom. In certain embodiments, the upper and lower hub springs may each include a convex spherical outer surface, a concave inner spherical surface and a series of elastomeric layers separated by inelastic shims. For example, the upper and lower hub springs may be high performance, ultra stiff springs having between fifteen and twenty-five inelastic shims. In some embodiments, the constant velocity joint assembly may be positioned above the rotational plane of the yoke.

In certain embodiments, the trunnion assembly may be a torque splitter enabling the yoke to have a scissoring degree of freedom. In such embodiments, the torque splitter may include a spline assembly, an upper trunnion member and a lower trunnion member. The spline assembly may be configured to receive the mast through a central opening. The spline assembly may also have a first plurality of outer splines oriented in a first direction and a second plurality of outer splines oriented in a second direction that is different from the first direction. The upper trunnion member may be disposed about the first plurality of outer splines and the lower trunnion member may be disposed about the second plurality of outer splines. In some embodiments, the first plurality of outer splines may be arranged helically about the spline assembly in the first direction and the second plurality of outer splines may be arranged helically about the spline assembly in the second direction. In certain embodiments, the spline assembly may include a first outer spline member having the first plurality of outer splines and a second outer spline member having the second plurality of outer splines.

In some embodiments, the upper and lower trunnion members may be operable to translate and rotate relative to the spline assembly such that translation of the upper and lower trunnion members in a first translational direction relative to the spline assembly causes the upper trunnion member to rotate relative to the spline assembly in a first rotational direction and causes the lower trunnion member to rotate relative to the spline assembly in a second rotational direction that is opposite of the first rotational direction. Similarly, translation of the upper and lower trunnion members in a second translational direction, that is opposite of the first translational direction, relative to the spline assembly causes the upper trunnion member to rotate relative to the spline assembly in the second rotational direction and causes the lower trunnion member to rotate relative to the spline assembly in the first rotational direction.

In certain embodiment, each of the leading and trailing bearings may include a series of elastomeric layers separated by inelastic shims with the elastomeric layers and the inelastic shims formed as spherical sections having a common focal point. In some embodiments, each of the leading and trailing bearings may be a divided bearing. In some embodiments, the four pillow blocks may be disposed about the yoke at approximately ninety degree intervals. In certain embodiments, the four pillow blocks may include first and second pillow blocks that are oppositely disposed on the yoke and generally parallel to each other to define a first pillow block axis extending generally perpendicularly therebetween. In addition, the four pillow blocks may include third and fourth pillow blocks that are oppositely disposed on the yoke and generally parallel to each other to define a second pillow block axis extending generally perpendicular therebetween that is generally orthogonal to the first pillow block axis.

In some embodiments, each pillow block may include upper and lower beams each having first and second ends with the upper and lower beams extending generally parallel to each other. Each pillow block may also include a first arm that extends between the first ends of the upper and lower beams that has a distal end with a hole and a second arm that extends between the second ends of the upper and lower beams that has a distal end with a hole. The first and second arms are generally parallel to each other and form angles relative to the upper and lower beams. A coupling element may extend through the holes generally perpendicularly to the first and second arms. The coupling element may receive the trailing end of one of the drive links. The upper and lower beams and the first arm may define a generally perpendicularly extending first opening and the upper and lower beams and the second arm may define a generally perpendicularly extending second opening through which the two connection members couple the pillow block between the upper surface of the yoke and the hub plate.

In a second aspect, the present disclosure is directed to a proprotor system for tiltrotor aircraft having a helicopter flight mode and an airplane flight mode. The proprotor system includes a mast, a yoke having four blade arms and an upper surface and a plurality of proprotor blades each coupled to one of the blade arms of the yoke. A constant velocity joint assembly provides a torque path from the mast to the yoke. The torque path includes a trunnion assembly, four drive links and four pillow blocks. The trunnion assembly is coupled to the mast and has four outwardly extending trunnions. Each of the drive links has a leading bearing coupled to one of the trunnions and a trailing bearing coupled to one of the pillow blocks. Each pillow block is independently mounted between the upper surface of the yoke and a hub plate with two connection members extending through the yoke and the pillow block. The constant velocity joint assembly provides a gimballing degree of freedom for the yoke relative to the mast. An upper hub spring is disposed between the trunnion assembly and the hub plate and a lower hub spring is disposed between the trunnion assembly and the yoke. The upper and lower hub springs are operable to dampen movement of the yoke in the gimballing degree of freedom. In the airplane flight mode, a first in-plane frequency of each proprotor blade is greater than 2.0/rev.

In some embodiments, in the airplane flight mode, the first in-plane frequency of each proprotor blade is less than 3.0/rev. In certain embodiments, in the airplane flight mode, the first in-plane frequency of each proprotor blade is between about 2.2/rev and about 2.8/rev. In other embodiments, in the airplane flight mode, the first in-plane frequency of each proprotor blade is between about 2.4/rev and about 2.6/rev. In some embodiments, the proprotor system may have a leading edge pitch horn and a pitch control assembly having a positive delta 3 angle coupled to each proprotor blade.

BRIEF DESCRIPTION OF THE DRAWINGS

For a more complete understanding of the features and advantages of the present disclosure, reference is now made to the detailed description along with the accompanying figures in which corresponding numerals in the different figures refer to corresponding parts and in which:

FIG. 2A-2F are various views of a proprotor system for use on a tiltrotor aircraft in accordance with embodiments of the present disclosure;

FIG. 3 is an exploded view of a constant velocity joint assembly of a proprotor system for use on a tiltrotor aircraft in accordance with embodiments of the present disclosure;

FIGS. 6A-6B are cross sectional views of a drive link of a proprotor system for use on a tiltrotor aircraft in accordance with embodiments of the present disclosure; and FIG. 7 is an exploded view of pillow block connections of a proprotor system for use on a tiltrotor aircraft in accordance with embodiments of the present disclosure.

DETAILED DESCRIPTION

While the making and using of various embodiments of the present disclosure are discussed in detail below, it should be appreciated that the present disclosure provides many applicable inventive concepts, which can be embodied in a wide variety of specific contexts. The specific embodiments discussed herein are merely illustrative and do not delimit the scope of the present disclosure. In the interest of clarity, not all features of an actual implementation may be described in the present disclosure. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would be a routine undertaking for those of ordinary skill in the art having the benefit of this disclosure.

In the specification, reference may be made to the spatial relationships between various components and to the spatial orientation of various aspects of components as the devices are depicted in the attached drawings. However, as will be recognized by those skilled in the art after a complete reading of the present disclosure, the devices, members, apparatuses, and the like described herein may be positioned in any desired orientation. Thus, the use of terms such as "above," "below," "upper," "lower" or other like terms to describe a spatial relationship between various components or to describe the spatial orientation of aspects of such components should be understood to describe a relative relationship between the components or a spatial orientation of aspects of such components, respectively, as the device described herein may be oriented in any desired direction.

Figure 1A:
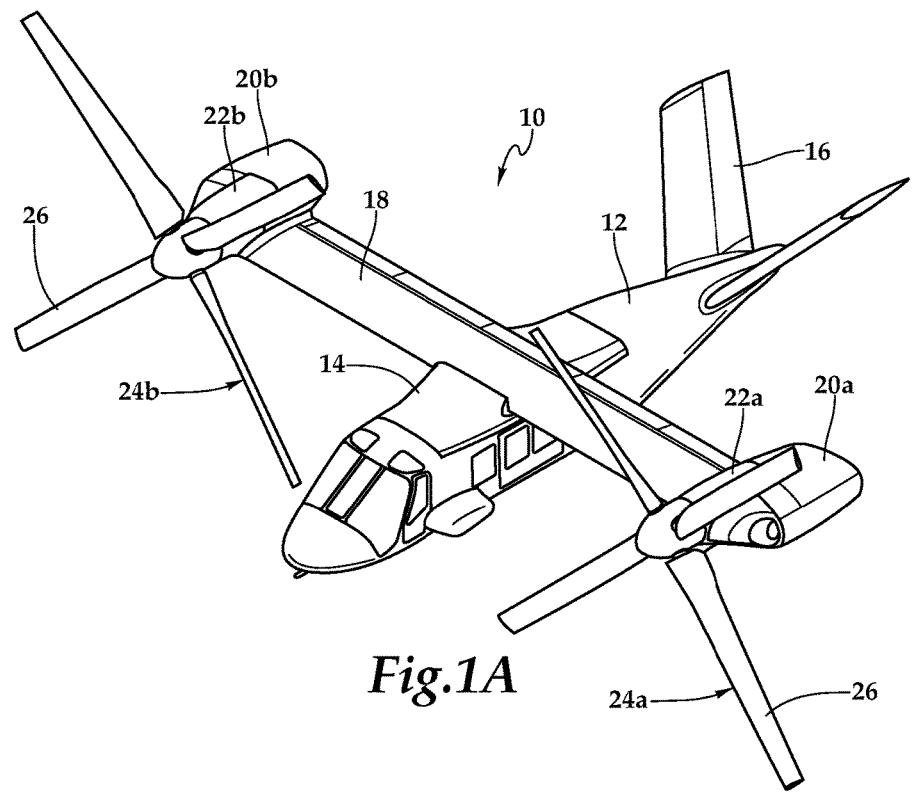
FIGS. 1A-1B are schematic illustrations of a tiltrotor aircraft in an airplane flight mode and a helicopter flight mode, respectively, in accordance with embodiments of the present disclosure.
Figure 1B:
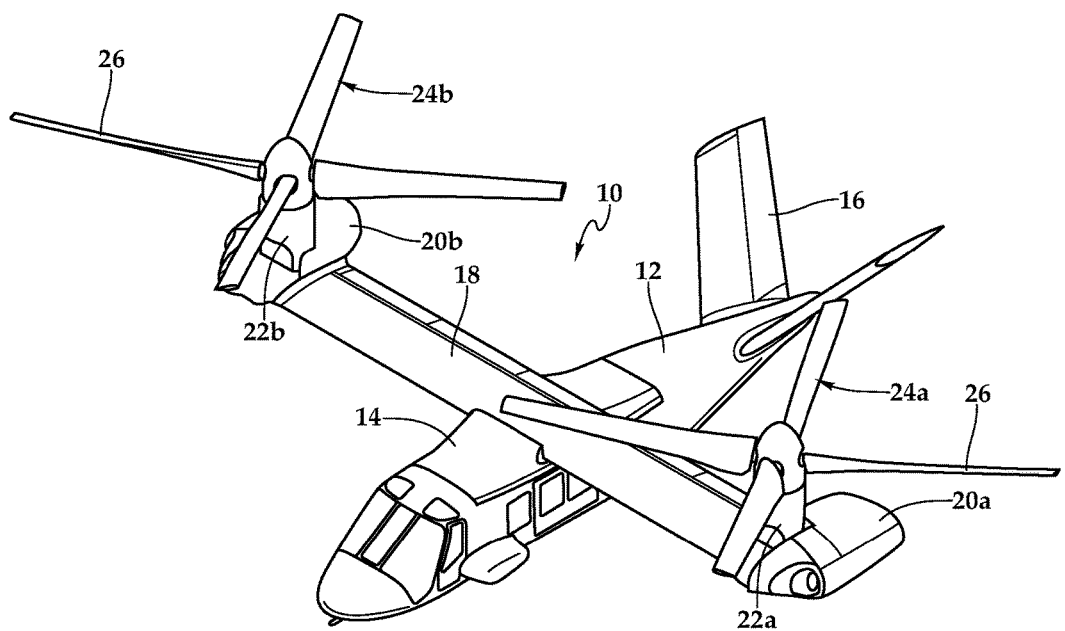

Referring to FIGS. 1A and 1B in the drawings, a tiltrotor aircraft is schematically illustrated and generally designated 10. Aircraft 10 includes a fuselage 12, a wing mount assembly 14 that is rotatable relative to fuselage 12 and a tail assembly 16 having control surfaces operable for horizontal and/or vertical stabilization during forward flight. A wing 18 is supported by wing mount assembly 14 and rotates with wing mount assembly 14 relative to fuselage 12 to enable tiltrotor aircraft 10 convert to a storage configuration. Together, fuselage 12, tail assembly 16 and wing 18 as well as their various frames, longerons, stringers, bulkheads, spars, ribs, skins and the like may be considered to be the airframe of tiltrotor aircraft 10.

Located proximate the outboard ends of wing 18 are fixed nacelles 20a, 20b, each of which preferably houses an engine and a fixed portion of a drive system. A pylon assembly 22a is rotatable relative to fixed nacelle 20a and wing 18 between a generally horizontal orientation, as best seen in FIG. 1A, a generally vertical orientation, as best seen in FIG. 1B. Pylon assembly 22a includes a rotatable portion of the drive system and a proprotor system 24a that is rotatable responsive to torque and rotational energy provided via the engine and drive system. Likewise, a pylon assembly 22b is rotatable relative to fixed nacelle 20b and wing 18 between a generally vertical orientation, as best seen in FIG. 1A, a generally horizontal orientation, as best seen in FIG. 1B. Pylon assembly 22b includes a rotatable portion of the drive system and a proprotor system 24b that is rotatable responsive to torque and rotational energy provided via the engine and drive system. In the illustrated embodiment, proprotor systems 24a, 24b each include four proprotor blades 26. It should be understood by those having ordinary skill in the art, however, that proprotor assemblies 24a, 24b could alternatively have a different number of proprotor blades, either less than or greater than four. In addition, it should be understood that the position of pylon assemblies 22a, 22b, the angular velocity or revolutions per minute (RPM) of the proprotor systems 24a, 24b, the pitch of proprotor blades 26 and the like are controlled by the pilot of tiltrotor aircraft 10 and/or the flight control system to selectively control the direction, thrust and lift of tiltrotor aircraft 10 during flight.

FIG. 1A illustrates tiltrotor aircraft 10 in a forward flight mode or airplane flight mode, in which proprotor systems 24a, 24b are positioned to rotate in a substantially vertical plane to provide a forward thrust while a lifting force is supplied by wing 18 such that tiltrotor aircraft 10 flies much like a conventional propeller driven aircraft. FIG. 1B illustrates tiltrotor aircraft 10 in a vertical takeoff and landing (VTOL) flight mode or helicopter flight mode, in which proprotor systems 24a, 24b are positioned to rotate in a substantially horizontal plane to provide a vertical thrust such that tiltrotor aircraft 10 flies much like a conventional helicopter. During operation, tiltrotor aircraft 10 may convert from helicopter flight mode to airplane flight mode following vertical takeoff and may convert back to helicopter flight mode from airplane flight mode for hover and vertical landing. In addition, tiltrotor aircraft 10 can perform certain flight maneuvers with proprotor systems 24a, 24b positioned between airplane flight mode and helicopter flight mode, which can be referred to as conversion flight mode.

Preferably, each fixed nacelle 20a, 20b houses a drive system, such as an engine and transmission, for supplying torque and rotational energy to a respective proprotor system 24a, 24b. In such embodiments, the drive systems of each fixed nacelle 20a, 20b may be coupled together via one or more drive shafts located in wing 18 such that either drive system can serve as a backup to the other drive system in the event of a failure. Alternatively or additionally, fuselage 12 may include a drive system, such as an engine and transmission, for providing torque and rotational energy to each proprotor system 24a, 24b via one or more drive shafts located in wing 18. In tiltrotor aircraft having both nacelle and fuselage mounted drive systems, the fuselage mounted drive system may serve as a backup drive system in the event of failure of either or both of the nacelle mounted drive systems.

In general, proprotor systems for tiltrotor aircraft should be designed to achieve blade flap or out-of-plane frequencies and lead-lag or in-plane frequencies that are sufficiently distant from the excitation frequencies generated by the proprotor systems corresponding to 1/rev (1 per revolution), 2/rev, 3/rev, etc. As an example, if a proprotor system has an operating speed of 360 RPM, the corresponding 1/rev excitation frequency is 6 Hertz (360/60=6 Hz). Similarly, the corresponding 2/rev excitation frequency is 12 Hz and the corresponding 3/rev excitation frequency is 18 Hz. It should be understood by those having ordinary skill in the art that a change in the operating speed of a proprotor system will result in a proportional change in the excitation frequencies generated by the proprotor system. For tiltrotor aircraft, operating in airplane flight mode typically requires less thrust than operating in helicopter flight mode. One way to reduce thrust as well as increase endurance, reduce noise levels and reduce fuel consumption is to reduce the operating speed of the proprotor systems. For example, in helicopter flight mode, the tiltrotor aircraft may operate at 100 percent of design RPM, but in airplane flight mode, the tiltrotor aircraft may operate at a reduced percent of design RPM such as between about 80 percent and about 90 percent of design RPM. Thus, to achieve desirable rotor dynamics, the proprotor systems for tiltrotor aircraft should be designed to avoid the frequencies of 1/rev, 2/rev, 3/rev, etc. for both helicopter flight mode and airplane flight mode operations.

To achieve acceptable rotor dynamics, conventional tiltrotor aircraft have operated proprotor systems having three twisted proprotor blades utilizing negative 15 degrees delta 3 pitch-flap coupling and having a first-in-plane frequency in airplane flight mode of about 1.4/rev. Delta 3 refers to the angle measured about the rotational axis of the proprotor system from an axis normal to the pitch change axis to the pitch horn attachment point of a proprotor blade. Delta 3 pitch-flap coupling is used to reduce or control the degree of blade flapping by automatically changing the blade pitch as the blade flaps up or down relative to its flap axis. It is noted that to achieve desired satiability for a conventional helicopter, when a blade raises about its flap axis, the blade pitch is reduced by the delta 3 pitch-flap coupling, which is known as positive delta 3 (flap up/pitch down). To achieve desired satiability for a conventional tiltrotor aircraft, however, when a blade raises about its flap axis, the blade pitch is increased by the delta 3 pitch-flap coupling, which is known as negative delta 3 (flap up/pitch up).

During high speed operations in airplane flight mode, it is important to control proprotor blade flapping on a tiltrotor aircraft, as the forward airspeed may induce proprotor aeroelastic instability, similar to propeller whirl flutter, that may couple to the wing and lead to failures. In addition, it can be important to maintain the flapping frequency sufficiently distant from the first-in-plane frequency. To achieve this balance, conventional tiltrotor aircraft have utilized a negative delta 3 angle of 15 degrees. Due to the location requirements for the pitch links and pitch horns necessary to achieve the negative 15 degrees delta 3 configuration, proprotor systems have been limited to the conventional three blade design. It is noted that for reasons including pilot fatigue, passenger comfort, noise reduction and vibration induced mechanical failures, to name a few, it is desirable to have more than three proprotor blades on each proprotor system of a tiltrotor aircraft.

In the illustrated embodiment, each proprotor system 24a, 24b includes four proprotor blades 26 that are positioned circumferentially about a hub assembly at ninety degree intervals. Proprotor blades 26 and the hub assembly are preferably designed to have sufficient stiffness to shift the first-in-plane frequency of proprotor blades 26, when tiltrotor aircraft 10 is in airplane flight mode, from the conventional 1.4/rev to a first-in-plane frequency above 2.0/rev. For example, the first in-plane frequency of proprotor blades 26 may be in a range between about 2.0/rev and about 3.0/rev. In some embodiments, the first in-plane frequency of proprotor blades 26 may preferably be in a range between about 2.2/rev and about 2.8/rev and more preferably in a range between about 2.4/rev and about 2.6/rev. Moving the first-in-plane frequency above 2.0/rev decouples the first-in-plane lead-lag frequency from the out-of-plane flapping frequency. This decoupling enables a shift from the conventional negative 15 degrees delta 3 configuration to a positive delta 3 configuration including up to about a positive 30 degrees delta 3 configuration. Using the disclosed positive delta 3 configuration, as well as leading edge pitch links and pitch horns, no longer limit the proprotor design to the conventional three blade configuration and enable the four blade configurations of the embodiments herein.

The desired proprotor blade stiffness and/or stiffness to mass ratio of the present embodiments is achieved using, for example, carbon-based materials for the structural components of proprotor blades 26 such as graphite-based materials, graphene-based materials or other carbon allotropes including carbon nanostructure-based materials such as materials including single-walled and multi-walled carbon nanotubes. In one example, the spar and/or skin of proprotor blades 26 are preferably monolithic structures formed using a broad goods and/or layered tape construction process having a manual or automated layup of a plurality of composite broad goods material layers including carbon fabrics, carbon tapes and combinations thereof, positioned over one or more mandrels having simple geometric surfaces with smooth transitions. After curing and other processing steps, the material layers form a high strength, lightweight solid composite members. In this process, the material thicknesses of the components can be tailoring spanwise and chordwise to the desired stiffness and/or stiffness to mass ratio. The proprotor blade components may be composed of up to about 50 percent, about 60 percent, about 70 percent, about 80 percent, about 90 percent or more of the carbon-based material or materials.

Referring next to FIGS. 2A-2F in the drawings, a proprotor system for tiltrotor aircraft is depicted and generally designated 100. In the illustrated embodiment, proprotor system 100 includes a hub assembly 102 including a yoke 104 that is coupled to a mast 106 via a constant velocity joint assembly 108. Hub assembly 102 rotates with mast 106, which is coupled to a drive system including an engine and transmission of the tiltrotor aircraft that provides torque and rotational energy to proprotor system 100. As discussed herein, constant velocity joint assembly 108 provides a gimballing degree of freedom for yoke 104 relative to mast 106 enabling yoke 104 to teeter in any direction relative to the rotational axis 110 of proprotor system 100. Accordingly, hub assembly 102 may be referred to as a gimbaled hub. In the illustrated implementation, constant velocity joint assembly 108 is positioned above the rotational plane of yoke 104 and is mounted on and/or coupled to an upper surface of yoke 104. As illustrated, yoke 104 includes four blade arms each of which holds and supports a proprotor blade 112. Each proprotor blade 112 includes a spar 114 that extends spanwise toward the tip of proprotor blade 112. Spars 114 are preferably the main structural members of proprotor blades 112 designed to carry the primary centrifugal and bending loads of proprotor blades 112. Spars 114 may have a root-to-tip twist on the order of about 30 degrees to about 40 degrees or other suitable root-to-tip twist.

Each spar 114 has a root section depicted as integral cuff 116 to enable coupling of each proprotor blade 112 with hub assembly 102 via bearing assemblies 118, 120. Each bearing assembly 118 is coupled to yoke 104 with a plurality of connecting members such as bolts, pins or the like. Likewise, each bearing assembly 120 is coupled to yoke 104 with a plurality of connecting members such as bolts, pins or the like. Each bearing assembly 120 includes a rotatably mounted beam assembly 122 having upper and lower blade grips 122a, 122b. As illustrated, each spar 114 is coupled to a respective beam assembly 122 at upper and lower blade grips 122a, 122b with a plurality of connecting members such as bolts, pins or the like. In addition, each spar 114 is coupled to a respective bearing assembly 118 via a suitable connection (not visible). Each spar 114 has a centrifugal force retention load path through integral cuff 116 via bearing assemblies 118, 120 to yoke 104. In the illustrated embodiment, each spar 114 includes an integral pitch horn 124 on the leading edge of spar 114 that is coupled to a leading edge pitch link 126 of a pitch control assembly 128 depicted as the rotating portion of a rise and fall swash plate operable to collectively and cyclically control the pitch of proprotor blades 112. Each proprotor blade 112 is operable to independently rotate relative to hub assembly 102 about its pitch change axis and thereby change pitch responsive to changes in position of the respective pitch link 126. Rotation of each proprotor blade 112 causes the respective beam assembly 122 to rotate relative to yoke 104 about the pitch change axis.

Figure 2A:
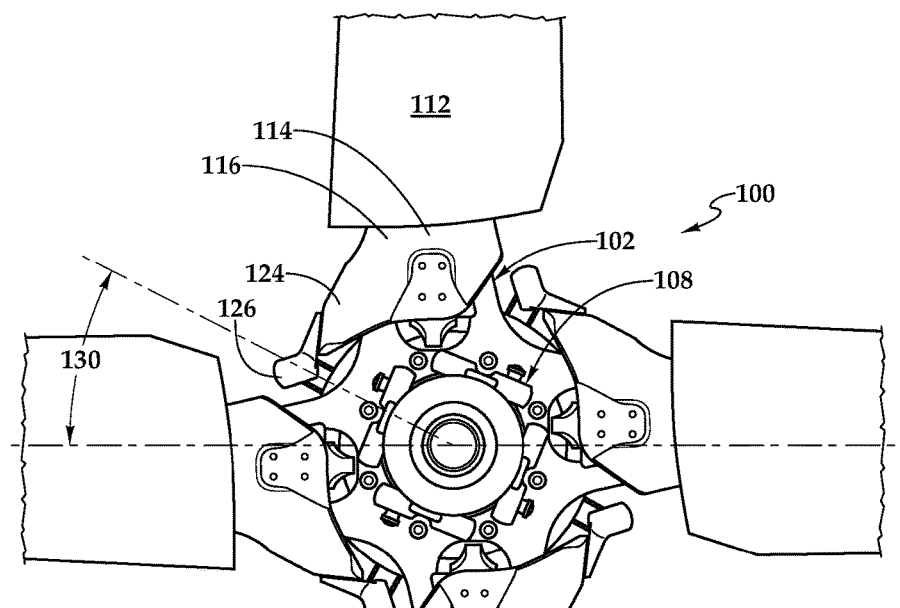
Figure 2B:
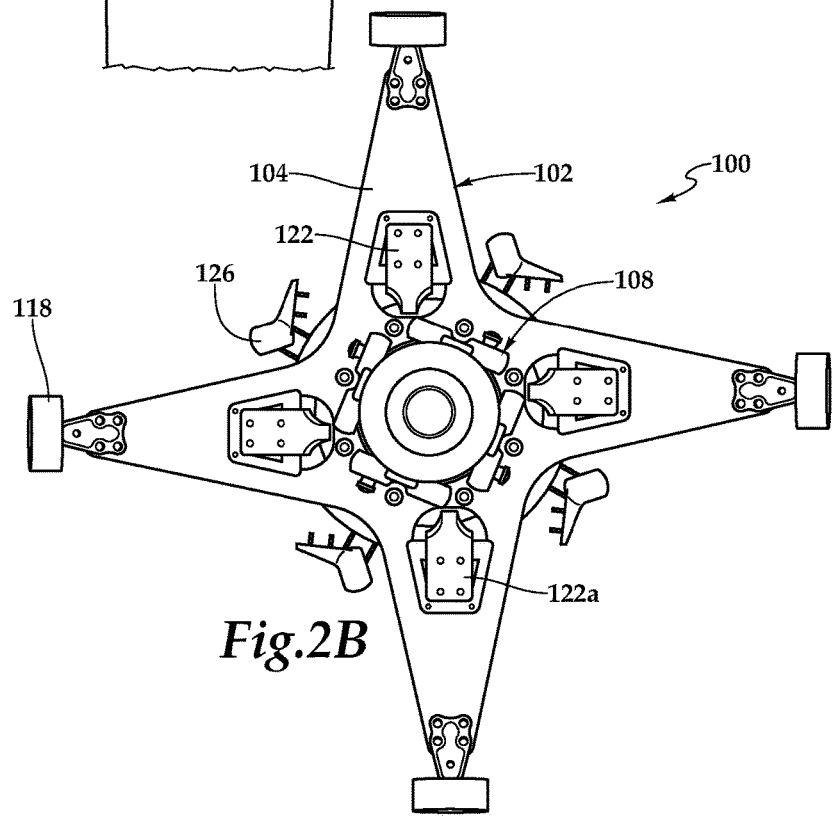
Figure 2E:
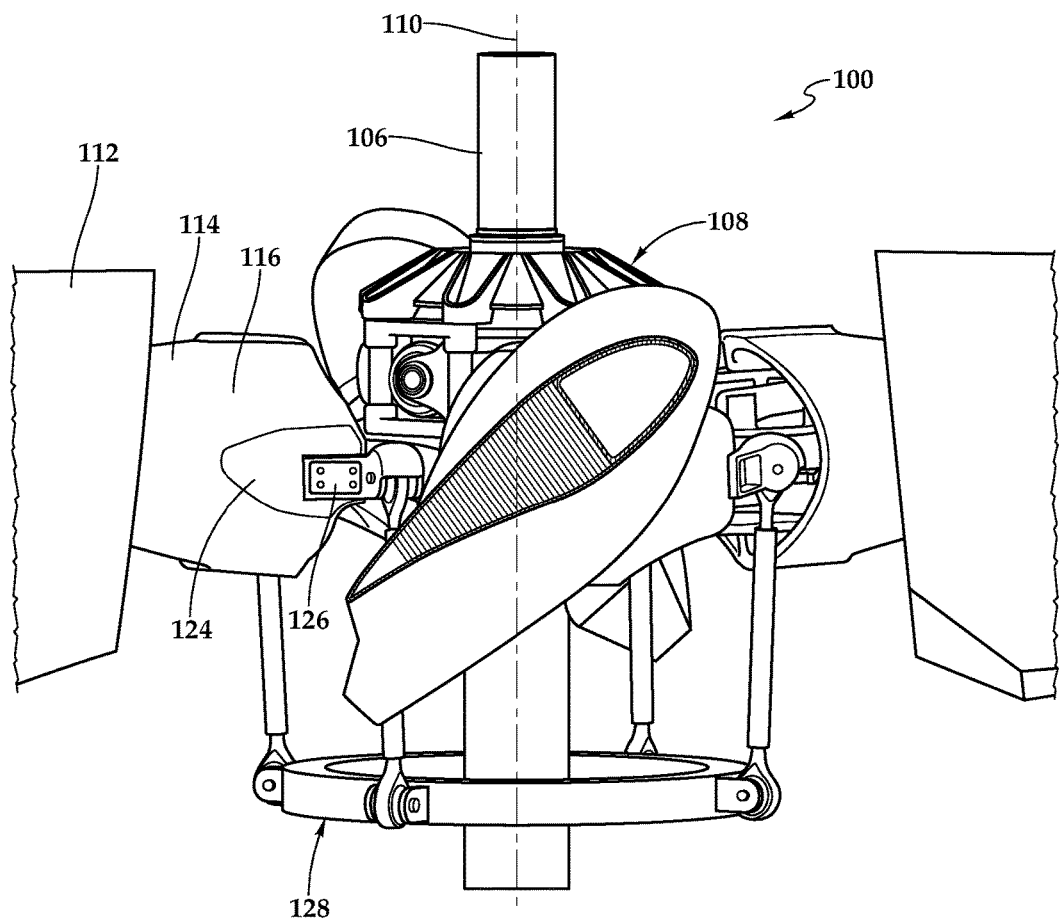
Figure 2F:
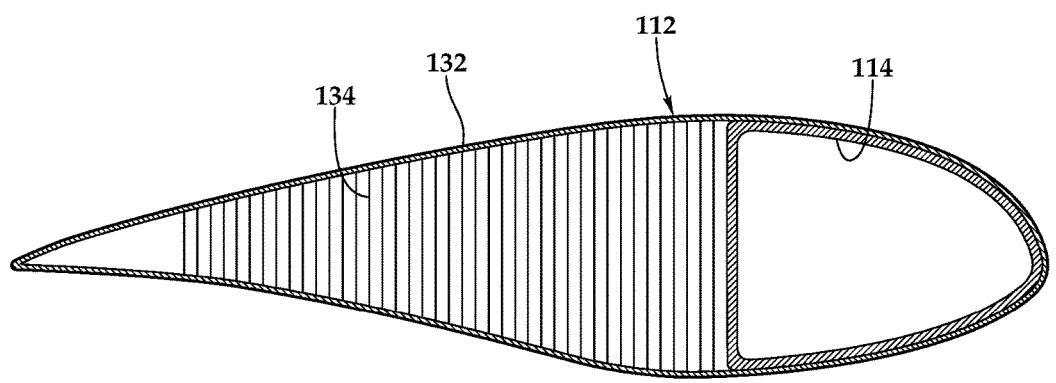

Preferably, spar 114 and the skin of each proprotor blade 112 are formed from a carbon-based material such that the proprotor blade stiffness and/or stiffness to mass ratio is sufficient to enable the first-in-plan frequency of proprotor blades 112 in the airplane flight mode of the tiltrotor aircraft to be in a range between about 2.0/rev and about 3.0/rev, more preferably in a range between about 2.2/rev and about 2.8/rev and most preferably in a range between about 2.4/rev and about 2.6/rev. By establishing the first-in-plane frequency above 2.0/rev and thus decoupling the first-in-plane lead-lag frequency from the out-of-plane flapping frequency, the delta 3 angle can be shifted from the conventional negative 15 degrees delta 3 configuration to a positive delta 3 configuration including up to about a positive delta 3 angle of 30 degrees. As best seen in FIG. 2A, angle 130 represents the positive delta 3 configuration of the present embodiment, wherein the delta 3 angle is about positive 30 degrees. Implementing the illustrated positive delta 3 configuration enables the four blade design of proprotor system 100 while avoiding interference between pitch links 126 and other components of proprotor system 100. As best seen in FIG. 2F, spar 114 and skin 132 of each proprotor blade 112 are preferably formed from a carbon-based material. In addition, each proprotor blade 112 may include a core 134 that provides stability, compression resistance and shear transfer between the upper and lower portions of skin 132. Core 134 may be formed from a carbon-based material, a nomex honeycomb structure or other suitable material.

Referring next to FIG. 3 of the drawings, constant velocity joint assembly 108 is described in greater detail. Constant velocity joint assembly 108 is provided between yoke 104 and mast 106 to allow mast 106 to transmit power through a variable angle, at constant speed, without an appreciable increase in friction or play, thereby providing the gimballing degree of freedom for yoke 104 relative to mast 106. In general, a constant velocity (CV) joint may refer to a type of mechanism that connects two rotating components making an angle with one another. This angle may vary during service, such as may be the case with the angle between yoke 104 and mast 106. A CV joint may mechanically couple an input element to an output element in such a way that torque may be transmitted from the input element to the output element while maintaining a substantially CV characteristic. A CV characteristic refers to a characteristic wherein the instantaneous angular velocity of the input element is substantially matched to the instantaneous angular velocity of the output element throughout a full rotation of the element. It is to be understood that the CV characteristic may represent a design goal, and various embodiments may achieve this characteristic to a greater or lesser degree based on parameters, which may include mechanical and structural variations in the assembly. Thus, a joint may maintain a substantially CV characteristic even if the angular velocities do not perfectly match. In some embodiments, a CV joint may maintain a substantially CV characteristic despite variations in angle between the input and output element.

In the illustrated embodiment, constant velocity joint assembly 108 includes a cap 200, a hub plate 202, an upper hub spring 204, an upper spherical adaptor 206, a trunnion assembly 208, four drive links 210, four pillow blocks 212, a lower spherical adaptor 214, a lower hub spring 216 and a lower hub spring support 218. Hub plate 202 includes eight hub plates arms 220 that extend radially outwardly from a hub plate body 222 at approximately forty-five degree intervals. In the illustrated embodiment, each hub plate arm 220 includes an opening (not visible) having a bushing 224 disposed therein that is sized to extend into an upper portion of an opening 250 of a respective pillow block 212. Alternatively, hub plate body 222 and pillow blocks 212 may have independent bushings. Internally, hub plate body 222 has a concave inner spherical surface 226 that is operable to receive and preferably be adhered to a convex outer spherical surface 228 of upper hub spring 204. Upper hub spring 204 includes a concave inner spherical surface (not visible) that is operable to receive and preferably be adhered to a convex outer spherical surface 230 of upper spherical adaptor 206.

Upper spherical adaptor 206 may be adhered or coupled to an upper surface 232 of trunnion assembly 208. Alternatively, upper spherical adaptor 206 may be integral with trunnion assembly 208. In the illustrated embodiment, trunnion assembly 208 is received on mast 106 via a matching spline coupling. Trunnion assembly 208 includes four outwardly extending trunnions 234. Two of the trunnions 234 are oppositely disposed on an upper trunnion member 236 and two of the trunnions 234 are oppositely disposed on a lower trunnion member 238. As discussed herein, upper trunnion member 236 and lower trunnion member 238 are operable to counter rotate relative to one another to provide a scissoring degree of freedom to yoke 104. Each trunnion 234 is received within an opening 240 of a leading bearing 242 of one of the drive links 210. An opening 244 of a trailing bearing 246 of each drive link 210 is received on a coupling element 248 of one of the pillow blocks 212. Each pillow block has a pair of openings 250 extending therethrough. An upper portion of each opening 250 is operable to receive a bushing 224 therein.

Lower spherical adaptor 214 may be adhered or coupled to a lower surface (not visible) of trunnion assembly 208. Alternatively, lower spherical adaptor 214 may be integral with trunnion assembly 208. Lower spherical adaptor 214 includes a convex outer spherical surface 252 that is operable to be received within and preferably be adhered to a concave inner spherical surface 254 of lower hub spring 216. Lower hub spring 216 has a convex outer spherical surface 256 that is operable to be received within and preferably be adhered to a concave inner spherical surface 258 of lower hub spring support 218. Lower hub spring support 218 is received within a central opening 260 of yoke 104. In the illustrated embodiment, yoke 104 includes eight openings (not visible) each having a bushing 262 disposed therein that is sized to extend into a lower portion of each opening 250 a respective pillow block 212. Alternatively, yoke 104 and pillow blocks 212 may have independent bushings.

Constant velocity joint assembly 108 is mounted on the upper surface 264 of yoke 104 using suitable connection member such as eight bolts that extend through the eight openings of yoke 104, the four pairs of two openings 250 of pillow blocks 212 and the eight openings of hub plate 202. The torque path from mast 106 to yoke 104 is as follows: torque is transferred from mast 106 to trunnion assembly 208 via the splined coupling therebetween. Torque then transfers to the leading bearings 242 of drive links 210 via trunnion 234. It is then transferred from the trailing bearings 246 of drive links 210 to pillow blocks 212 via coupling elements 248. Torque is then transferred to yoke 104 from pillow blocks 212 via the connection member.

Figure 4A:
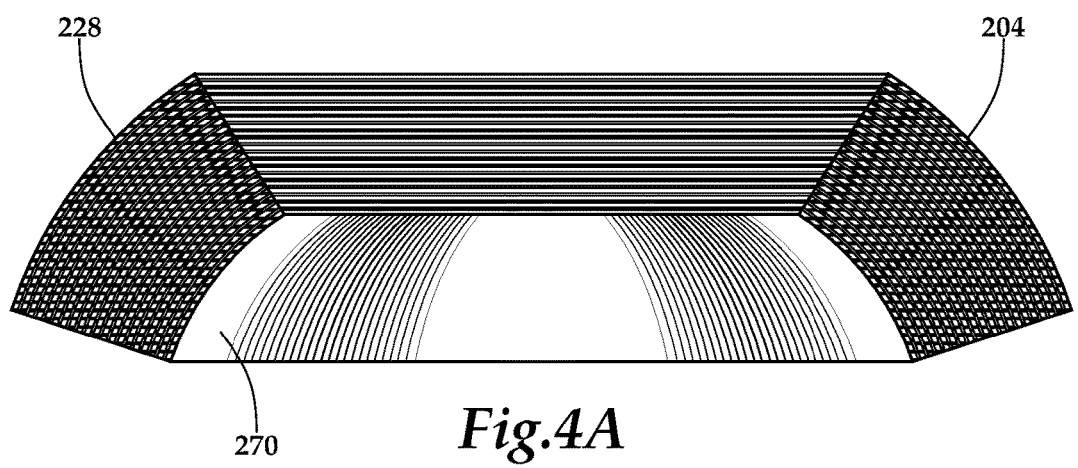
FIGS. 4A-4B are cross sectional views of upper and lower hub springs of a proprotor system for use on a tiltrotor aircraft in accordance with embodiments of the present disclosure.
Figure 4B:
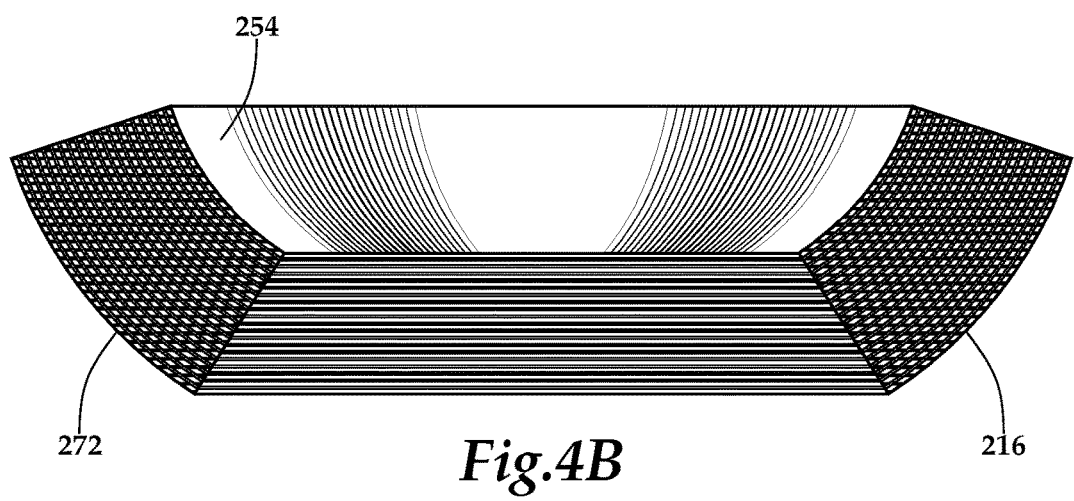

Referring additionally to FIGS. 4A-4B in the drawings, therein are depicted cross sectional views of upper hub spring 204 and lower hub spring 216, respectively. In the illustrated embodiment, upper hub spring 204 and lower hub spring 216 each comprises a laminated spherical component that includes a series of layers of elastomeric material of predetermined thickness separated by a series of relatively inelastic, or non-extensible, members, such as metal shims between the elastomeric layers. Upper hub spring 204 and lower hub spring 216 are preferably high performance, ultra stiff hub springs the utilize a high number of metal shims, such as between fifteen and twenty-five metal shims, with nineteen metal shims depicted in the drawings. The outermost elastomeric layer of upper hub spring 204 has a spherical convex surface 228 and the innermost elastomeric layer has a spherical concave surface 270. Each of the elastomeric layers and metal shims of upper hub spring 204 is formed as a spherical section and is positioned so that their focal points are coincident. Likewise, the outermost elastomeric layer of lower hub spring 216 has a spherical convex surface 272 and the innermost elastomeric layer has a spherical concave surface 254. Each of the elastomeric layers and metal shims of lower hub spring 216 is formed as a spherical section and is positioned so that their focal points are coincident. In the operational configuration of constant velocity joint assembly 108, the focal points of the elastomeric layers and metal shims of upper hub spring 204 are preferably coincident with the focal point of the elastomeric layers and metal shims of lower hub spring 216 such that upper hub spring 204 and lower hub spring 216 are components of a single spherical element. Upper hub spring 204 and lower hub spring 216 have spring rates that counteract movement of yoke 104 in its gimballing degree of freedom.

Figure 5:
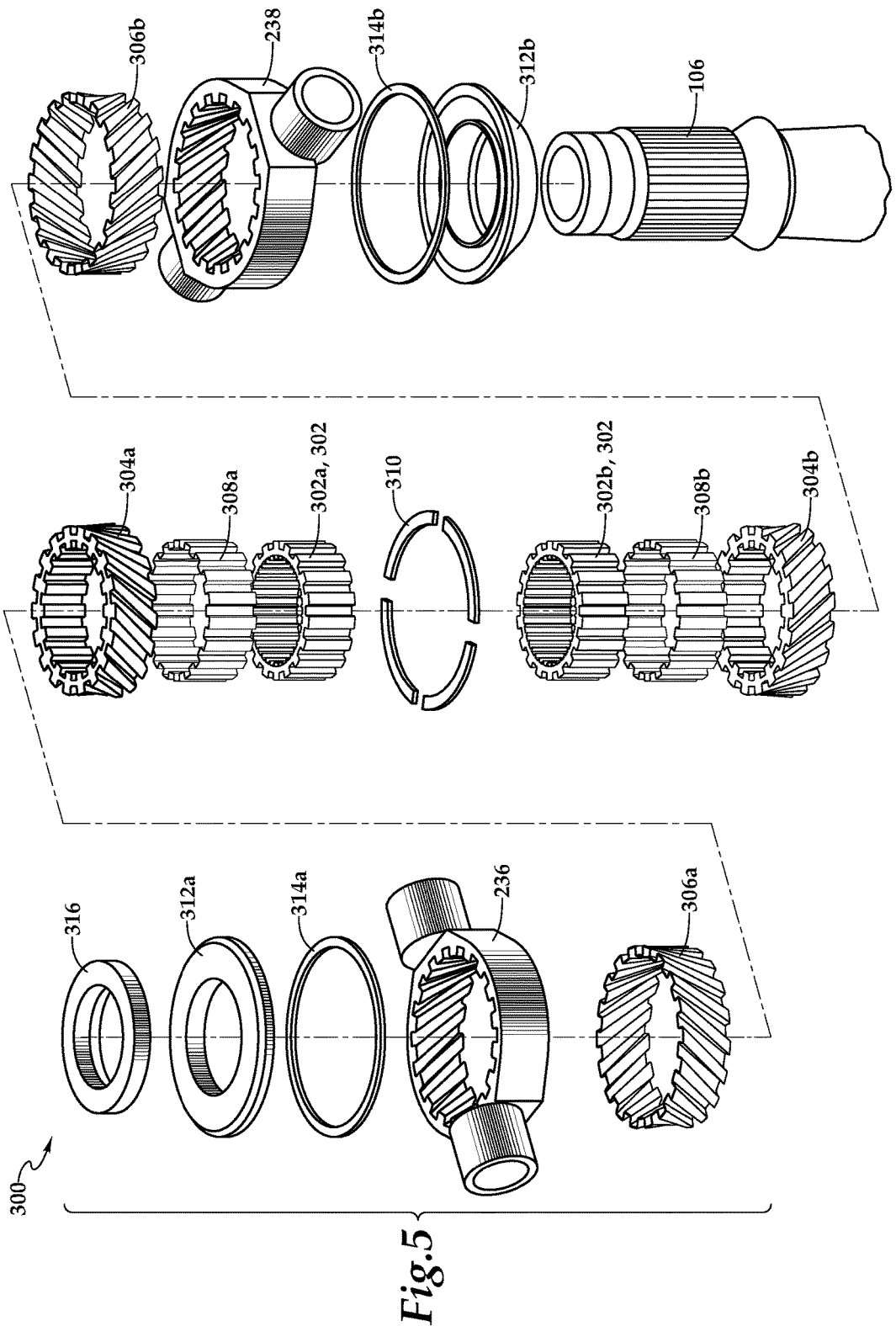
FIG. 5 is an exploded view of a torque splitter of a proprotor system for use on a tiltrotor aircraft in accordance with embodiments of the present disclosure.

Referring additionally to FIG. 5 in the drawings, therein is depicted an exploded view of a torque splitter 300 disposed within trunnion assembly 208. Torque splitter 300 includes an inner spline member 302 depicted as inner spline element 302a and inner spline element 302b. Inner spline elements 302a, 302b are preferably coupled together or may be integral with each other and include an inner spline that allows inner spline member 302 to receive torque from mast 106. Inner spline member 302 includes an outer spline that allows outer spline members 304a, 304b to move axially relative to inner spline member 302. Outer spline members 304a, 304b include inner splines that correspond to the outer splines of inner spline member 302. In some embodiments, outer spline members 304a, 304b may be coupled together such that outer spline members 304a, 304b move together axially relative to inner spline member 302.

Outer spline members 304a, 304b include outer splines oriented in different directions. For example, outer spline member 304a has helical splines oriented at a first direction while outer spline member 304b has helical splines oriented at a second direction different from and preferably opposite of the first direction. Upper trunnion member 236 includes inner splines that correspond to the outer splines of outer spline member 304a. Lower trunnion member 238 includes inner splines that correspond to the outer splines of outer spline member 304b. Torque splitter 300 may also include a variety of bearing members, such as upper and lower trunnion bearings 306a, 306b and spline bearings 308a, 308b. As illustrated, upper trunnion bearing 306a separates upper trunnion member 236 from outer spline member 304a, lower trunnion bearing 306b separates lower trunnion member 238 from outer spline member 304b, spline bearing 308a separates outer spline member 304a from inner spline members 302a and spline bearing 308b separates outer spline member 304b from inner spline members 302b. In some example embodiments, upper and lower trunnion bearings 306a, 306b and spline bearings 308a, 308b may be made from an elastomeric material, such as rubber. A spacer 310 may be provided that separates upper and lower trunnion members 236, 238. Upper and lower retention members 312a, 312b, upper and lower retention bearings 314a, 314b and a cap 316, separately or in combination, prevent certain axial displacement of upper and lower trunnion members 236, 238 relative to mast 106.

In this configuration, spline assembly 302 allows upper and lower trunnion members 236, 238 to transmit equal drive torque while moving relative to each other in a kinematic scissoring motion, which may eliminate some kinematic binding forces. For example, upper and lower trunnion members 236, 238 may scissor relative to each other in response to the scissoring degree of freedom of yoke 104. In some embodiments, torque splitter 300 allows upper and lower trunnion members 236, 238 to scissor relative to each other by allowing outer spline members 304a, 304b to move axially in a direction that allows upper and lower trunnion members 236, 238 to scissor on opposing helical splines. For example, when one trunnion member begins to lead or lag, an unbalanced axial load in the helical splines causes displacement of outer spline members 304a, 304b relative to inner spline member 302 such that equilibrium is restored and the torque is balanced. It should be noted that while upper and lower retention members 312a, 312b prevent axial movement of upper and lower trunnion members 236, 238, outer spline members 304a, 304b may be free to move axially without being limited by upper and lower retention members 312a, 312b.

Referring additionally to FIGS. 6A-6B in the drawings, therein are depicted cross sectional views of a drive link 210 including a leading bearing 242 and a trailing bearing 246. Leading bearing 242 includes a central bushing 320 having an opening 240. Training bearing 246 includes a central bushing 322 having an opening 244. As discussed herein, opening 240 of leading bearing 242 receives a trunnion 234 therein and opening 244 of trailing bearing 246 receives a coupling element 248 of a pillow blocks 212 therein. Leading and trailing bearings 242, 246 are each formed from a series of layers of elastomeric material of predetermined thickness separated by a series of relatively inelastic, or non-extensible, members, such as metal shims between the elastomeric layers. The outermost elastomeric layer of each bearing is disposed adjacent to a spherical concave surface of the body of drive link 210, as best seen in FIG. 6B. Likewise, the innermost elastomeric layer is disposed adjacent to a convex spherical surface of the respective central bushing 320, 322, as best seen in FIG. 6B. The elastomeric layers and metal shims in leading bearing 242 are each spherical sections shaped so that their focal points are coincident at location 324. The elastomeric layers and metal shims in trailing bearing 246 are each spherical sections shaped so that their focal points are coincident at location 326. Leading and trailing bearings 242, 246 are preferably high performance, ultra stiff bearings the utilize a high number of metal shims, such as between fifteen and twenty-five metal shims, with sixteen metal shims depicted in the drawings.

During operation of the proprotor system using drive links 210, as torque is transmitted from trunnion assembly 208 to pillow blocks 212, the elastomeric layers at the leading edge of leading bearing 242 and the trailing edge of trailing bearing 246 are subjected substantially entirely to cyclically varying compressive loads while the diametrically-opposite elastomeric layers of leading bearing 242 and trailing bearing 246 may be subjected substantially entirely to cyclically varying tensile loads. To minimize the cyclically varying tensile loads, which may cause molecular tearing, cavitation, accelerate propagation of fatigue cracking and/or elastomer degradation, leading bearing 242 and trailing bearing 246 are preferably divided bearings wherein the elastomeric layers and metal shims are discontinuous about the periphery of the bearing. In the illustrated embodiment, the metal shims include inner sections that extend approximately ninety degrees about each bearing and outer sections that extend approximately two hundred and sixty degrees about each bearing. In addition, there are two voids that separate inner and outer sections of the elastomeric layers that are approximately ninety degrees apart. By providing such separations in each of the bearings, tensile type stresses in the elastomeric layers can be avoided, thereby enhancing the fatigue life of bearings.

Referring additionally to FIG. 7 in the drawings, therein is depicted a simplified exploded view showing the mating components for coupling constant velocity joint assembly 108 to yoke 104. The illustrated section includes hub plate 202, four pillow blocks 212, yoke 104 and eight connection members depicted as bolts 350, nuts 352 and lock washers 354. As described herein, hub plate 202 includes eight hub plate arms 220 that extend radially outwardly from a hub plate body 222 at approximately forty-five degree intervals. Each hub plate arm 220 includes an opening having a bushing 224 disposed therein that is sized to extend into an upper portion of an opening 250 of a respective pillow block 212. As illustrated, four independent pillow blocks 212 are disposed about yoke 104 at approximately ninety-degree intervals. In this configuration, there are two set of oppositely disposed pillow blocks 212. The pillow blocks 212 in each set are generally parallel to each other such that one set defines a pillow block axis 356 extending generally perpendicularly therebetween and the other set defines a pillow block axis 358 extending generally perpendicularly therebetween that is generally orthogonal to pillow block axis 356.

Each pillow block 212 includes upper and lower beams 360, 362 that are generally parallel to each other. Arms 364, 366 extend between upper and lower beams 360, 362. Arms 364, 366 are generally parallel to each other and extend at angles relative to upper and lower beams 360, 362. Each arm 364, 366 has a distal end with a hole (not visible). A coupling element 248 extends through the respective holes of arms 364, 366 and is coupled thereto. Coupling element 248 extends generally perpendicularly between arms 364, 366. Upper and lower beams 360, 362 together with arm 364 define one of the generally perpendicularly extending openings 250 through pillow block 212. Likewise, upper and lower beams 360, 362 together with arm 366 define the other of the generally perpendicularly extending openings 250 through pillow block 212. An upper portion of each opening 250 is operable to receive a bushing 224 therein. A lower portion of each opening 250 is operable to receive a bushing 262 therein. In the illustrated embodiment, yoke 104 includes eight openings (not visible) each having a bushing 262 disposed therein that is sized to extend into a lower portion of an opening 250 of a respective pillow block 212. Constant velocity joint assembly 108 is mounted on the upper surface 264 of yoke 104 and secured thereto with the eight connection members, two of which extend through each pillow block 212. Through the use of four independent pillow blocks 212 with two connection members coupling each between yoke 104 and hub plate 202, a high stiffness hub assembly 108 is formed.

The foregoing description of embodiments of the disclosure has been presented for purposes of illustration and description. It is not intended to be exhaustive or to limit the disclosure to the precise form disclosed, and modifications and variations are possible in light of the above teachings or may be acquired from practice of the disclosure. The embodiments were chosen and described in order to explain the principals of the disclosure and its practical application to enable one skilled in the art to utilize the disclosure in various embodiments and with various modifications as are suited to the particular use contemplated. Other substitutions, modifications, changes and omissions may be made in the design, operating conditions and arrangement of the embodiments without departing from the scope of the present disclosure. Such modifications and combinations of the illustrative embodiments as well as other embodiments will be apparent to persons skilled in the art upon reference to the description. It is, therefore, intended that the appended claims encompass any such modifications or embodiments.

What is claimed is:

1. A high stiffness hub assembly for a proprotor system operable to rotate with a mast of a tiltrotor aircraft having a helicopter flight mode and an airplane flight mode, the hub assembly comprising:
    a yoke having four blade arms each adapted to hold a proprotor blade, the yoke having a rotational plane and an upper surface; and
    a constant velocity joint assembly providing a torque path from the mast to the yoke, the torque path including a trunnion assembly, four drive links and four pillow blocks, the trunnion assembly coupled to the mast and having four outwardly extending trunnions, each of the drive links having a leading bearing coupled to one of the trunnions and a trailing bearing coupled to one of the pillow blocks and each pillow block independently mounted between the upper surface of the yoke and a hub plate with two connection members extending through the yoke and the pillow block;
    wherein, the yoke has a gimballing degree of freedom relative to the mast.

2. The hub assembly as recited in claim 1 further comprising upper and lower hub springs, the upper hub spring disposed between the trunnion assembly and the hub plate, the lower hub spring disposed between the trunnion assembly and the yoke, the upper and lower hub springs operable to dampen movement of the yoke in the gimballing degree of freedom.

3. The hub assembly as recited in claim 2 wherein the upper and lower hub springs each further comprises a convex spherical outer surface, a concave inner spherical surface and a series of elastomeric layers separated by inelastic shims.

4. The hub assembly as recited in claim 3 wherein each series of elastomeric layers separated by inelastic shims of the upper and lower hub springs further comprises between fifteen and twenty-five inelastic shims.

5. The hub assembly as recited in claim 1 wherein the constant velocity joint assembly is positioned above the rotational plane of the yoke.

6. The hub assembly as recited in claim 1 wherein the trunnion assembly further comprises a torque splitter enabling the yoke to have a scissoring degree of freedom.

7. The hub assembly as recited in claim 6 wherein the torque splitter further comprises:
    a spline assembly configured to receive the mast through a central opening, the spline assembly having a first plurality of outer splines oriented in a first direction and a second plurality of outer splines oriented in a second direction different from the first direction;
    an upper trunnion member disposed about the first plurality of outer splines; and
    a lower trunnion member disposed about the second plurality of outer splines.

8. The hub assembly as recited in claim 7 wherein the first plurality of outer splines further comprise first helically arranged outer splines and the second plurality of outer splines further comprise second helically arranged outer splines.

9. The hub assembly as recited in claim 7 wherein the spline assembly further comprises a first outer spline member having the first plurality of outer splines and a second outer spline member having the second plurality of outer splines.

10. The hub assembly as recited in claim 7 wherein the upper and lower trunnion members are operable to translate and rotate relative to the spline assembly;
    wherein, translation of the upper and lower trunnion members in a first translational direction relative to the spline assembly causes the upper trunnion member to rotate relative to the spline assembly in a first rotational direction and causes the lower trunnion member to rotate relative to the spline assembly in a second rotational direction that is opposite of the first rotational direction; and
    wherein, translation of the upper and lower trunnion members in a second translational direction that is opposite of the first translational direction relative to the spline assembly causes the upper trunnion member to rotate relative to the spline assembly in the second rotational direction and causes the lower trunnion member to rotate relative to the spline assembly in the first rotational direction.

11. The hub assembly as recited in claim 1 wherein each of the leading and trailing bearings further comprises a series of elastomeric layers separated by inelastic shims; and
 wherein, each of the elastomeric layers and the inelastic shims further comprises a spherical section having a common focal point.

12. The hub assembly as recited in claim 11 wherein each of the leading and trailing bearings further comprises a divided bearing.

13. The hub assembly as recited in claim 1 wherein the four pillow blocks are disposed about the yoke at approximately ninety degree intervals.

14. The hub assembly as recited in claim 1 wherein each pillow block further comprises:
 upper and lower beams each having first and second ends, the upper and lower beams extending generally parallel to each other;
 a first arm extending between the first ends of the upper and lower beams and having a distal end with a hole;
 a second arm extending between the second ends of the upper and lower beams and having a distal end with a hole, the first and second arms generally parallel to each other and forming angles relative to the upper and lower beams; and
 a coupling element extending generally perpendicular to the first and second arms and through the holes, the coupling element receiving the trailing bearing of one of the drive links;
 wherein, the upper and lower beams and the first arm define a generally perpendicularly extending first opening;
 wherein, the upper and lower beams and the second arm define a generally perpendicularly extending second opening; and
 wherein, the two connection members respectively extend through the first and second openings to couple the pillow block between the upper surface of the yoke and the hub plate.

15. The hub assembly as recited in claim 1 wherein the four pillow blocks further comprise:
 first and second pillow blocks that are oppositely disposed on the yoke, generally parallel to each other and define a first pillow block axis extending generally perpendicularly therebetween; and
 third and fourth pillow blocks that are oppositely disposed on the yoke, generally parallel to each other and define a second pillow block axis extending generally perpendicular therebetween that is generally orthogonal to the first pillow block axis.

16. A proprotor system for tiltrotor aircraft having a helicopter flight mode and an airplane flight mode, the proprotor system comprising:
 a mast;
 a yoke having four blade arms and an upper surface;
 a plurality of proprotor blades each coupled to one of the blade arms of the yoke;
 a constant velocity joint assembly providing a torque path from the mast to the yoke, the torque path including a trunnion assembly, four drive links and four pillow blocks, the trunnion assembly coupled to the mast and having four outwardly extending trunnions, each of the drive links having a leading bearing coupled to one of the trunnions and a trailing bearing coupled to one of the pillow blocks and each pillow block independently mounted between the upper surface of the yoke and a hub plate with two connection members extending through the yoke and each pillow block, the constant velocity joint assembly providing a gimballing degree of freedom for the yoke relative to the mast; and
 upper and lower hub springs, the upper hub spring disposed between the trunnion assembly and the hub plate, the lower hub spring disposed between the trunnion assembly and the yoke, the upper and lower hub springs operable to dampen movement of the yoke in the gimballing degree of freedom;
 wherein, in the airplane flight mode, a first in-plane frequency of each proprotor blade is greater than 2.0/rev.

17. The proprotor system as recited in claim 16 wherein, in the airplane flight mode, the first in-plane frequency of each proprotor blade is less than 3.0/rev.

18. The proprotor system as recited in claim 16 wherein, in the airplane flight mode, the first in-plane frequency of each proprotor blade is between about 2.2/rev and about 2.8/rev.

19. The proprotor system as recited in claim 16 wherein, in the airplane flight mode, the first in-plane frequency of each proprotor blade is between about 2.4/rev and about 2.6/rev.

20. The proprotor system as recited in claim 16 further comprising a leading edge pitch horn and a pitch control assembly having a positive delta 3 angle coupled to each proprotor blade.

* * * * *